Feb. 23, 1932.    J. H. WAGENHORST    1,846,236
DEMOUNTABLE WHEEL
Filed June 11, 1929
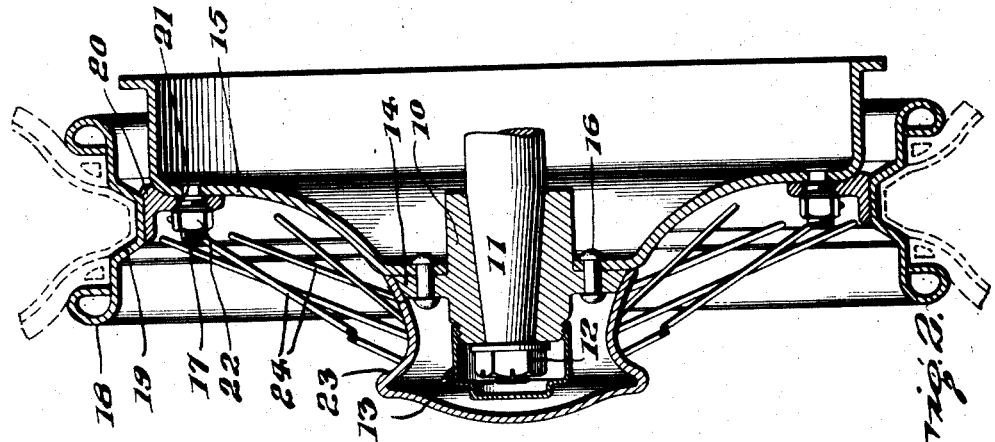
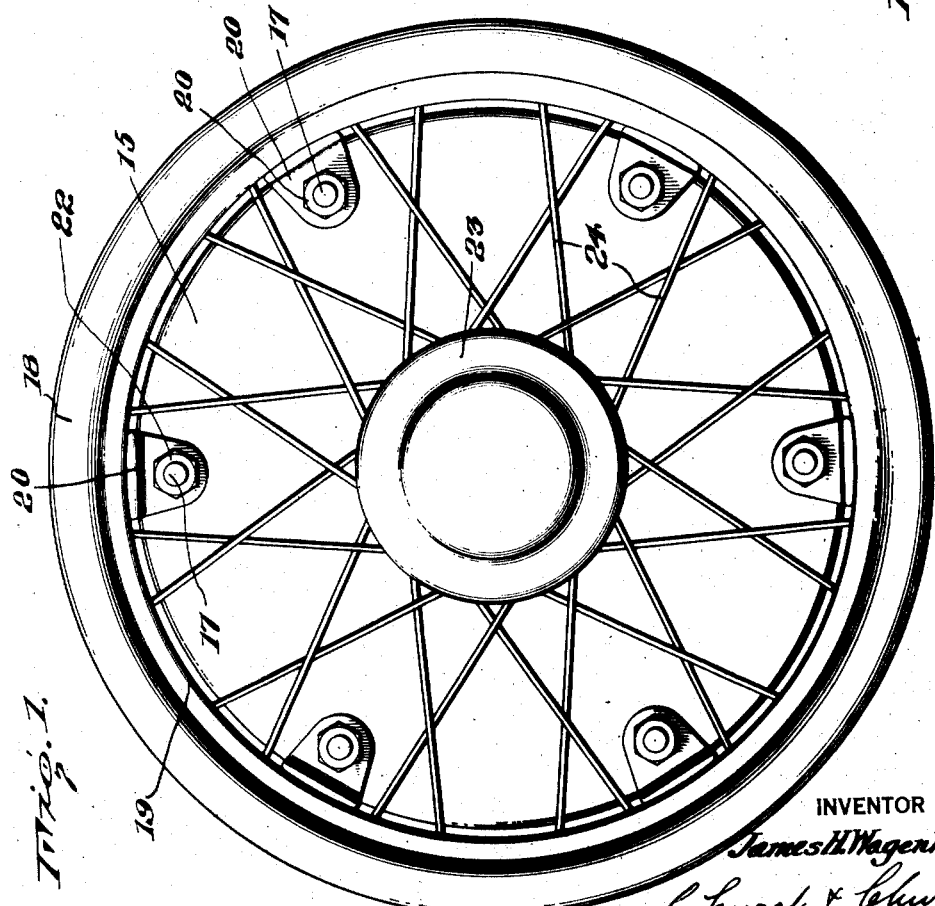
INVENTOR
James H. Wagenhorst,
BY Church & Church
His ATTORNEYS Patented Feb. 23, 1932

1,846,236

UNITED STATES PATENT OFFICE

JAMES H. WAGENHORST, OF DETROIT, MICHIGAN

DEMOUNTABLE WHEEL

Application filed June 11, 1929. Serial No. 370,051.

My invention relates to improvements in demountable wheels and has to do, more particularly, with demountable wheels simulating in appearance the conventional wire wheels.

Most automobiles are now equipped with four-wheel brakes and brake drums are mounted on both front and rear axles. The widespread use of balloon tires has resulted in a decreased rim diameter and an increase in the width and strength of the rims. The brake drums used are of such size that they are but little less in diameter than the rims. The chief object of my invention is to make use of these conditions to provide a demountable wire wheel which shall be stronger, lighter and cheaper than those heretofore used. A further object of my invention is to provide a demountable wire wheel in which the center line of the rim is properly and accurately located to give the tread for which the axle is designed, as distinguished from the usual wire wheel construction in which the center line of the rim is displaced about an inch, due to the exigencies of the spoke lacing design. It is an object of my invention to provide a demountable wire wheel in which the rim is detachably connected to the brake drum, independently of the hub, and the spoke lacing takes practically no part in the transmission of load and torque, from hub to rim, and vice versa, but does assist in transmitting side-thrust from rim to hub. It is a further object of my invention to provide a construction in which the spoke lacing will be tensioned as the hub shell is drawn to its seat on the hub by the devices which connect the rim to the brake drum.

Further objects, and objects relating to details and economies of construction and operation, will definitely appear from the detailed description to follow. In one instance, I accomplish the objects of my invention by the devices and means set forth in the following specification. My invention is clearly defined in the appended claims. A structure constituting a preferred embodiment of my invention is illustrated in the accompanying drawings, forming a part of this specification, in which:

Figure 1 is a view in front elevation of a demountable wheel embodying my invention, and Fig. 2 is a central, vertical sectional view thereof.

In the drawings, the same reference numerals refer to the same parts throughout the several views.

In general, my invention consists in providing a brake drum secured to the usual hub, a rim detachably connected to the brake drum independently of the hub, and a hub shell connected to the rim by wire spoke lacing. The load and torque forces are transmitted from rim to hub, and vice versa, through the brake drum and not through the wire spokes as in the usual demountable wire wheel. I propose to use, in this combination, a rim of the dropped-base type, as this gives a rim of sufficient stiffness to maintain its true form without reference to the spoke lacing or the tension of the wire spokes. The rim may be connected to the brake drum by studs on the latter projecting through bolt holes in securing lugs attached to the rim, and nuts screwed on the studs and engaging the lugs. The hub shell covers and surrounds the otherwise exposed portion of the hub and may seat on a flange on the hub. When the hub shell is drawn to its seat by the devices connecting the rim and brake drum, the wire spokes will be tensioned and serve to transmit side thrust from rim to hub.

Referring to the numbered parts of the drawings illustrating the preferred embodiment of my invention, the hub 10 is fixed on the end of the axle shaft 11, being held thereon by nut 12, which is covered by the dust cap 13. My invention has nothing to do with the particular mounting of the hub on the axle. Of course, in the case of a front axle, the hub will be journaled on a spindle in the usual manner. Hub 10 has a radially-extending flange 14, to which the brake drum 15 is attached by rivets 16. The brake drum carries a plurality of threaded studs 17, near its periphery, which extend parallel to the wheel axis.

The tire-carrying rim 18 is of the dropped-base type, having a central inwardly-extending channel 19 formed in the rim base. This serves to stiffen the rim, without undue increase in weight, and brings the inner surface of the rim base close to the periphery of the brake drum. A plurality of securing lugs 20 are rigidly attached, as by riveting or welding, to the base of the rim channel 19, and extend radially inward therefrom. Each of these lugs has a bolt hole 21 therein, through which the studs 17 project. These bolt holes are sufficiently larger than the studs to provide ample clearance and the outer ends of the bolt holes are countersunk to provide concave recesses receiving the convex faces on nuts 22, which are screwed on the studs and engage the lugs.

The hub shell 23 surrounds and covers the exposed portion of hub 10. Its rear portion seats on the periphery of flange 14. The hub shell 23 is connected to rim 18 by the lacing of wire spokes 24 extending between the hub shell and the dropped base portion of the rim. These spokes may be laced in any approved manner and, when the nuts 22 are screwed up, drawing the hub shell to its seat on flange 14, the spokes will be tensioned.

This wheel can readily be demounted by unscrewing and removing the nuts 22, thus permitting the removal of the wheel body comprising the rim, lugs, spokes and hub shell. With this construction the rim does not need to be alined laterally with respect to the hub shell, since the load and torque are not intended to be transmitted through the spoke lacing. This allows the rim to be properly lined up on the axle in accordance with the design intended by the axle builder. Furthermore, spokes of aluminum, or similar material, can be used, since they are not called upon to resist severe stresses. This gives us a very strong, light and inexpensive demountable wheel construction, which has the advantages of the attached lug rim in ease of operation and the ornamental attributes of the detachable wire wheel.

I am aware that the structure shown herein may be changed considerably, without departing from the spirit of my invention, and, therefore, I claim my invention broadly, as indicated by the appended claims.

What I claim is:

1. A demountable wheel comprising the combination of a hub, a brake drum secured thereto, a tire-carrying rim, means for detachably connecting said rim to said brake drum independently of the hub, a hub shell surrounding and covering the exposed portion of the hub, and a plurality of interlaced wire spokes connecting said hub shell with the rim.

2. A demountable wheel comprising the combination of a hub, a brake drum secured thereto, a tire-carrying rim having a dropped base, a plurality of securing lugs rigidly attached to said dropped base and provided with bolt holes, studs carried by said brake drum and projecting through said bolt holes, nuts screwed on said studs and engaging the lugs, a hub shell surrounding and covering the exposed portion of the hub, and wire spoke lacing connecting said hub shell and the dropped base portion of the rim.

3. A demountable wheel comprising the combination of a hub having a radial flange, a brake drum secured to said flange, a tire-carrying rim detachably connected to the braked rum independently of the hub, a hub shell surrounding the exposed portion of the hub and seating on said flange, and wire spoke lacing connecting said hub shell and rim.

4. A demountable wheel comprising the combination of a hub having a radial flange, a brake drum secured to said flange, a tire-carrying rim detachably connected to said brake drum independently of the hub, a plurality of securing lugs rigidly attached to said rim and provided with bolt holes, studs carried by said brake drum and projecting through said bolt holes, nuts screwed on said studs and engaging said lugs, a hub shell surrounding the exposed portion of the hub and seated on said flange, and wire spoke lacing connecting said hub shell and rim.

5. A demountable wheel comprising the combination of a hub, a brake drum secured thereto, a hub shell surrounding and having a seat on said hub, a tire-carrying rim, wire spoke lacing connecting said rim and hub shell, and means for detachably connecting said rim to the brake drum independently of the hub, whereby said hub shell is drawn to its seat on the hub and the spoke lacing tensioned.

JAMES H. WAGENHORST.